United States Patent Office.

TIMOTHY J. FEALY, OF BOSTON, MASSACHUSETTS.

ILLUMINATING COMPOSITION.

SPECIFICATION forming part of Letters Patent No. 400,651, dated April 2, 1889.

Application filed October 23, 1888. Serial No. 288,888. (No specimens.)

*To all whom it may concern:*

Be it known that I, TIMOTHY J. FEALY, of Boston, in the county of Suffolk and State of Massachusetts, have invented certain new and useful Improvements in Compositions for Illuminating Purposes, of which the following is a full, clear, and exact description.

This invention relates to a composition for illuminating purposes, and is intended more especially to be burned in a suitable receptacle or in candle form, with a proper wick, for use more particularly in the sanctuary of a church or for church decoration; and the invention consists of a composition suitable for illuminating purposes, to burn with a wick, consisting of the following-named ingredients, all substantially as hereinafter described:

Take of olive-oil ten pints, wax one pound, salt one-half ounce, and place them in a suitable vessel and stir and mix all together under heat in any suitable manner, and when all are thoroughly melted and mixed the compound is poured into any suitable receptacle or vessel desired or into a suitable mold of the shape desired, a wick being placed in proper position for the compound to surround it, as is usual in making candles, and when cold it is ready for use.

When the compound is ready to be used, preferably in a vessel or receptacle, it is very useful in churches in the sanctuary or for church decoration, where it can be hung or suspended in any suitable manner. It is also in a convenient form for transportation, as being solid will not spill, and is much more preferable for such uses than the oil-lamps now used. The wax serves to keep the compound in a solid state and the salt to preserve the same.

It is not intended to limit the invention to the exact proportions of the ingredients herein given, as they can be varied more or less and produce good results. It is preferable, however, to have them as herein stated.

Having thus described my invention, what I claim is—

A composition for illuminating purposes, composed of olive-oil, wax, and salt, in or about the proportions stated.

In testimony whereof I have hereunto set my hand in the presence of two subscribing witnesses.

TIMOTHY J. FEALY.

Witnesses:
 EDWIN W. BROWN,
 GEORGE O. BOYNTON.